United States Patent [19]

Clack et al.

[11] Patent Number: 4,951,217

[45] Date of Patent: Aug. 21, 1990

[54] SYSTEM AND PROCESS FOR GENERATING A TOOL PATH OFFSET

[75] Inventors: James B. Clack, Palm Harbor; Clayton D. Huntsman, Brandon, both of Fla.

[73] Assignee: PMX, Inc., Palm Harbor, Fla.

[21] Appl. No.: 229,564

[22] Filed: Aug. 5, 1988

[51] Int. Cl.$^5$ ............................................. G05B 19/25
[52] U.S. Cl. ............................. 364/474.2; 364/474.18
[58] Field of Search ........... 364/474.18, 474.2, 474.24; 318/572

[56] References Cited

U.S. PATENT DOCUMENTS

| | | | |
|---|---|---|---|
| 4,503,493 | 3/1985 | Burkhardt et al. | 364/474.18 |
| 4,618,924 | 10/1986 | Hinds | 364/474.18 X |
| 4,706,201 | 11/1987 | Kishi et al. | 364/474.29 |
| 4,720,796 | 1/1988 | Kishi et al. | 364/474.2 |

FOREIGN PATENT DOCUMENTS

0102302 5/1987 Japan .

*Primary Examiner*—Clark A. Jablon
*Attorney, Agent, or Firm*—Sitrick & Sitrick

[57] ABSTRACT

A system and method of tool path processing is taught which offsets a tool path from a given geometric sequence, avoiding tool interference and accounting for coincident tool paths. It guides a numerically-controlled machine tool in the manufacturing process. In accordance with the present invention, a computer-aided-manufacturing system defines or allows definition of a pattern to be machined by a tool having an offset, analyzes the pattern for points of intersection, breaks down the pattern into contiguous segments between points of intersection, structures a list of the segments, ordered between intersection points, defines tool path chains, responsive to the list; validates the tool path chains to define valid tool paths, and, guides the movement of the tool along a valid tool path.

26 Claims, 3 Drawing Sheets

TOOLPATH I: 3,4,5,13
TOOLPATH II: 8,9,10

SYSTEM AND PROCESS FOR GENERATING A TOOL PATH OFFSET

BACKGROUND

Several processes for dealing with considerations of tool path offset currently exist.

(1) N-item Lookahead:

This method is limited to searching forward along the tool path for a change in sense such as an arc that was clockwise before offset and became counterclockwise after offset. It fails to detect keyhole interference or allow for coincident tool path segments.

(2) Projected Bisectors:

This method projects geometric bisectors between adjacent geometry items and searches for intersections of bisectors. After all of the bisectors have coincided, a web is formed, from which a tool path may be generated by breaking up the legs of the web and interconnecting them. This method requires a completely enclosed machinable zone, and can only be used inside of a closed contour (a pocket).

(3) Intersection Tree:

This method offsets the tool path and generates an intersection list which is inspected and sorted based upon the nesting level of the intersections within one another. This process is in common use today as it operates quickly and manages special cases well. However, it is expensive in process time and implementation. It relies heavily on special case processing and is thus slow and cumbersome to use.

These existing processes suffer from many shortcomings, including speed and ease of use, special case restrictions, and end application limitations, as discussed hereinabove.

In accordance with the present invention, a system and method of tool path processing is taught which offsets a tool path from a given geometric sequence, avoiding tool interference and accounting for coincident tool paths. It guides a numerically-controlled machine tool in the manufacturing process.

ZONE is used herein to refer to the process and system incorporating the process.

The ZONE process is a two-dimensional geometric offset process which can be used in numerically-controlled machining or computer aided-manufacturing applications.

The ZONE process is used to generate the locus of the center of a circle (representing a tool) as it rolls along a given geometric path, maintaining tangency as it rolls, and guiding the (numerically controlled machine) tool in the manufacturing process.

The ZONE process avoids tool interference problems that would cause the tool to take off excessive material. These problems traditionally fall into two classes:

(a) Small-move interference: A tool must travel into a concave area that is smaller than the tool dimension. In this case, the tool cannot machine the specified area.

(b) Keyhole interference: A tool path crosses a prior (or future) tool path, taking material off from an area that has already been or will be machined. In this case, the tool retracts and moves past the interference area, then resumes machining.

The ZONE process handles the case of coincident tool path, which arises when a tool passes through a channel that is equal in width to the tool diameter.

The ZONE method does not segregate between open contours (those that start at one location and end at another) and closed contours (those that start and end at the same location).

BRIEF DESCRIPTION OF THE DRAWINGS:

The present invention will be more clearly understood by reference to the drawings in conjunction with the Detailed Description of the Drawings, wherein:

FIGS. 1 A-E illustrate the geometry chain, toolside zone chain, check zone chain, guard zone chain and tool path chain;

Figures 1A, 1B:
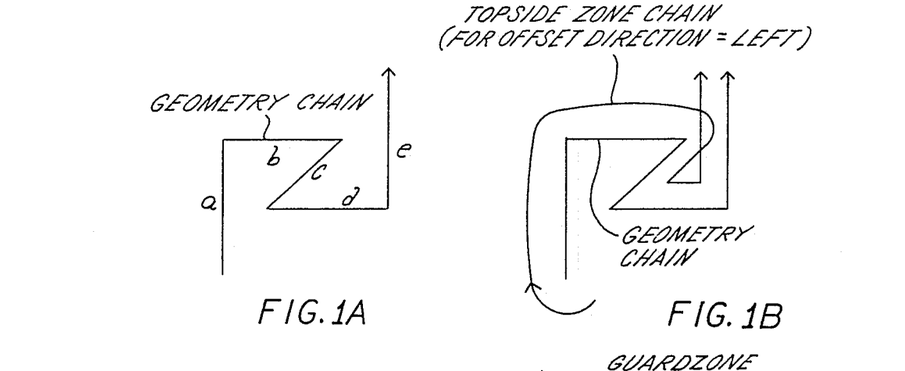
Figure 2:
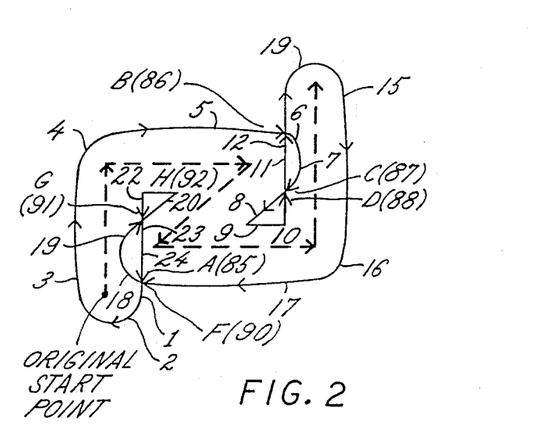
FIG. 2 illustrates an application example of various aspects of the present invention, including geometry items, geometry chains, toolside zone chains, checkzone chains, nodes and tool offset direction.
Figure 6:
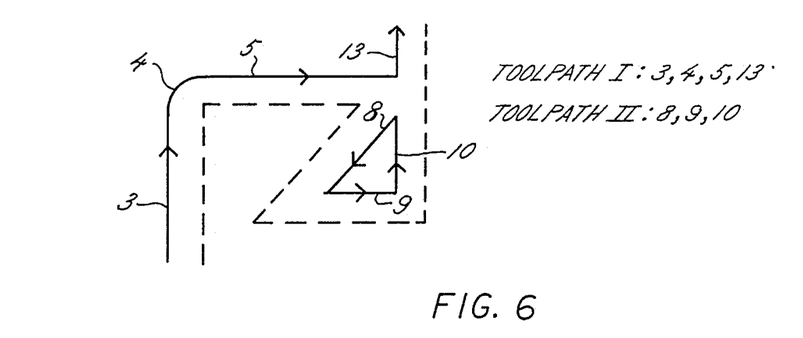
FIG. 6, illustrates the final validated tool paths relative to FIG. 2.

DETAILED DESCRIPTION OF THE DRAWINGS:

Referring to FIG. 1(A), a geometry chain is illustrated, comprised of geometry items a, b, c, d and e. The geometry items or segments are arbitrarily labeled with letters a–e, and are chosen to provide a complete description of contiguous joined segments of the geometry chain. The geometry item can be any identified portion of the given description of the object pattern that is to be machined as the final geometry chain. The geometry chain is also illustrated in FIG. 2 as the dashed line and in FIG. 6 as the dashed line. Geometry items are illustrated in FIGS. 2 and 6 as numbered segments or nodes 1–24.

Figure 1C:
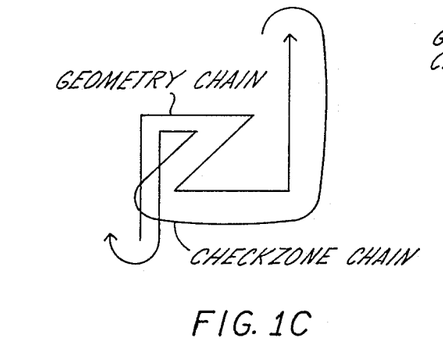
Figure 1D:
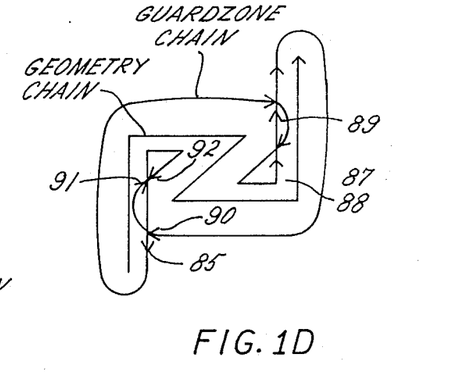
Figures 3, 4:
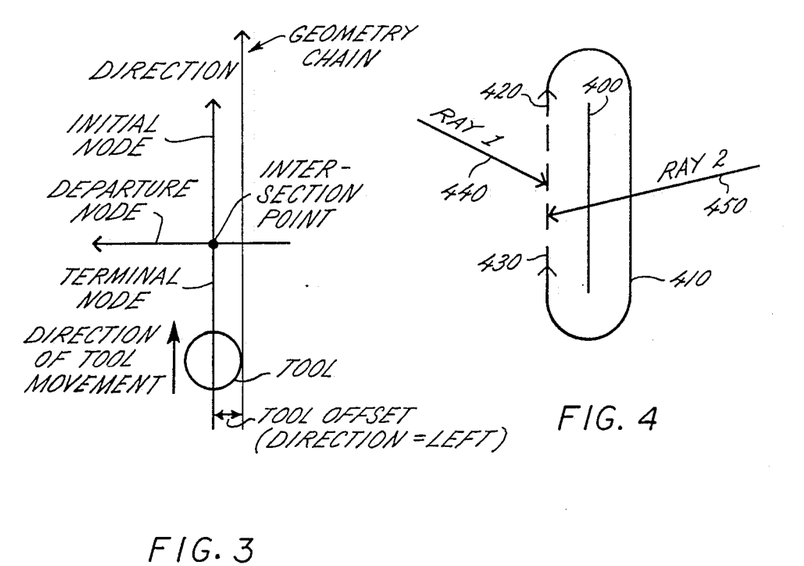
FIG. 3 illustrates, for an exemplary tool path and tool, the concepts of tool offset, tool direction, Initial Node, Terminal Node, Departure Node and Intersection Point (Marker)
FIGS. 4 and 5 each illustrate two examples of tool path validation in accordance with the teachings of the present invention.

In accordance with the present invention, a zone is built around the desired geometry chain, spaced away from the geometry chain by the tool offset (as illustrated in FIGS. 1(D), 2, and 3). The tool is illustrated in FIG. 3 as offset to the left. (Right tool offset is not illustrated). The zone built around the geometry chain can be subdivided into a tool side zone chain, illustrated in FIG. 1(B) for a tool offset direction of left, and a check zone chain as illustrated in FIG. 1(C) corresponding to the tool size zone chain illustrated in FIG. 1(B). The check zone chain illustrated in FIG. 1(C) is the remainder of the guard zone chain after removing the tool side zone chain.

As illustrated in FIG. 3, the tool offset can be represented as the radius of the circle of the tool itself, which is used to generate the tool path. The tool offset is illustrated in FIG. 3 directly, as well as indirectly being taken into consideration in FIGS. 1, 2 and 6. The offset direction of the tool can be utilized in accordance with the present invention as a flag to indicate whether the tool path is to the left or to the right of the geometry items when viewed along the direction of motion of the tool movement, as illustrated in FIG. 3.

Referring again to FIG. 1(D), the guard zone chain is illustrated, representing the combination of the tool side zone chain and check zone chain. The guard zone chain represents the locus of all points equidistant by the tool offset from the geometry items in the geometry chain as illustrated in FIG. 1(D). Next, having thus defined the guard zone chain, the guard zone chain of FIG. 1(D) is analyzed, in accordance with the present invention, to determine points of intersection, illustrated in FIG. 1(D) as intersection marker points 85, 86, 87, 88, and 89.

Figure 1E:
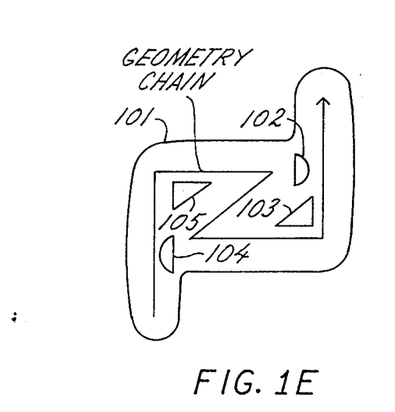

In accordance with the present invention, the guard zone chain is analyzed between points of intersection, to determine tool path chains lying between said points of intersection. A tool path chain is a contiguous locus of points between intersection points, of tool paths for tool movement for the geometry chain for a predefined guard zone chain. The tool path chain is a segment (or segments) of the guard zone chain between two intersections of the guard zone chain of itself with itself, as illustrated in FIGS. 1(D) and 1(E). The tool path is the movement of the tool, which can be represented as the locus of the center of a circle (e.g. representing the tool) as it rolls tangent to the geometry items, as illustrated in FIG. 1(E) and in FIG. 6. There are numerous alternate tool paths which can be utilized to machine a given pattern or geometry chain.

FIGS. 1(D) and 1(E) illustrate the five tool path chains resulting from analysis of FIG. 1(D) between points of intersection 85–89, in accordance with the present invention. Tool path 101, 102, 103, 104 and 105 represent the five tool path chains for the guard zone chain of FIG. 1(D) and 1(E), between points of intersection 85–92.

Referring now to FIG. 2, a drawing of the geometry chain and guard zone chain of FIG. 1(D) are reproduced, with the addition of numbering of segments (or geometry items or nodes) of the guard zone as nodes 1–24 and the addition of Intersection Markers A,B,C,- D,E,F,G, and H. Nodes 3–13 are the tool side chain. Nodes 14–24 are the check zone chains. Nodes 1–24 comprise the entire guard zone chain. Nodes 1–24 are arbitrarily numbered for reference purposes.

As described in further detail hereinafter, the segment nodes 1–24 of the guard zone chain are analyzed for points of intersection of the guard zone chain with itself. A list can be created of all intersections, as illustrated in Table 1. In constructing Table 1, first Intersection Markers are noted. For example, Intersection Marker A represents the intersection of Node 1 and Node 24 with Nodes 18 and 17. This corresponds to intersection point 85 of FIG. 1(D). Intersection Markers A,B,C,D,E,F,G, and H correspond to intersection points 85,86,87,88,89,90,91 and 92, respectively.

Referring to FIG. 3 for each intersection point or marker, there is an Initial node, a Terminal node and a Departure node. As illustrated in FIG. 3, the Terminal node is that which the tool movement traverses in entering the intersection point. The Initial node is the contiguous node to the point of intersection proceeding along the same line as the Terminal node. The Departure node is the contiguous node to the point of intersection, taking the turn to the left direction as illustrated in FIG. 3 for a left tool offset (direction).

In accordance with the present invention, and with reference to FIGS. 2, 3 and Table 1, the intersection list of Table 1 is constructed for the pattern of FIG. 2. The intersection list provides structured data on intersections of guard zone segments, and also contains information such as the Terminal node, Initial node, and Departure node. The Initial node is considered the starting geometry position or portion of a tool path chain. The Terminal node is the final geometry position or portion of geometry of the tool path chain. The Departure node is the Initial node of a tool path chain that emanates from the end of a Terminal node.

ZONE

The ZONE process operates by identifying for each tool path chain a zone around the geometry, making a list of all intersections, resequencing each chain between intersections by taking all turns to intersecting chains, validating each chain, then resequencing all chains that are retained into a control sequence for the NC machine.

Guard Zone Building

As illustrated in FIGS. 1A–1D, the first step to build a guard zone around each geometry chain.

Each geometry chain (see FIG. 1A) is surrounded by a Zone (see FIG. 1D) that is spaced away from the geometry chain by the tool offset (see FIG. 1D, FIG. 3). The offset may be larger on the toolside zone chain (see FIG. 1B) than on the check zone chain (see FIG. 1C) to compensate for offsets greater than the actual tool radius.

Referring to FIG. 2, Nodes 1–24, are arbitrarily numbered groups of geometry items, which identify certain portions of the chains.

Node is a generic term, used herein to identify certain portions of chains.

FIG. 2 and Table 1, illustrate the process of building an intersection list, and ordering and sequencing line segments between points of intersection, including a list of Initial, Terminal, and Departure Nodes (as illustrated in FIG. 3).

Table 2 illustrates the alternate structuring of a list defining tool path chains, and segments thereof, including startpoints and endpoints for each segment, between points of intersection, corresponding to Table 1.

Figure 5:
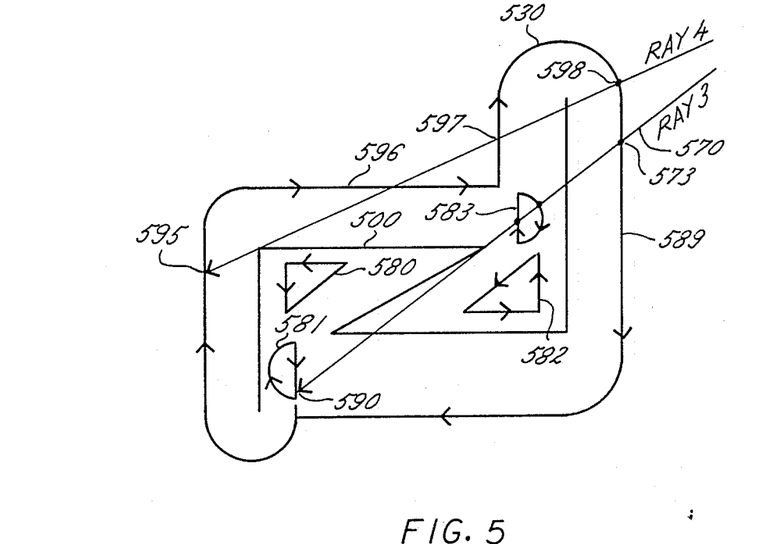

Tables 4 and 5, and FIGS. 2 and 5, illustrate the process of validation. FIG. 4 illustrates tool path validation.

Intersection list

The guard zone chain is inspected and all intersections are found and entered into an intersection list. The Initial and Terminal nodes are noted, as well as the Departure node that is the Initial node for the intersecting portion of the guard zone chain.

Sequencing

The intersection list of Table 1 is traversed in a forward direction, each time, taking the Departure node, until the first Initial node is re-encountered or the list is broken. This process is shown starting with Initial Node 1, the Intersection List is traversed in the order as illustrated, starting at each Intersection Marker, and proceeding until the Initial Node is re-encountered. These traversals are saved as tool path chains, for all intersections, as illustrated in Table 4. The tool path chain as illustrated in Table 3 is shown in Table 4 as Tool Path Chain 1.

Referring to FIG. 3, the Tool, tool offset, tool direction, Initial Node, Terminal Node and Departure Node are illustrated for a specified Intersection point.

These concepts and terminology are used to determine and to describe the Intersection List, Sequencing, and Tool Path Validation. The tool can be any tool, such as for machining a piece part. The tool can be modeled as being a circle having a radius equal to the tool offset, said circles rolling along a tool path to machine a respective associated geometry chain. A Tool Identity reference variable can be established, such as by user definition or by means of a Tool Identity software model library. The Tool Identity is a means of representing a tool of any arbitrary configuration.

The Tool is coming into a Terminal node as it approaches the intersection.

Initial node is direction out of Terminal node continuing in same direction as original tool movement.

Departure node is direction of intersector out of Terminal node, in direction that tool path will ultimately take in traversing the Departure node.

Tool Path Validation

Each tool path chain is either entirely valid or entirely invalid. To determine the validity, a ray is projected from an arbitrary point on the chain. The intersections of this ray with all other portions of the guard zone chain are tracked, as well as the final merge into the tool path chain in question. Crossings from left-to-right will add one; crossings from right-to-left will subtract one. The final merge is scored as a zero if the merge is from same side as the offset direction; otherwise as a one if the offset direction is left, a minus one if right. If the result is zero, then the tool path chain is valid. Otherwise, it must be flagged as discardable.

Referring to Table 6 in conjunction with FIGS. 4 and 5, four examples of tool path validation in accordance with one embodiment of the present invention are illustrating.

Referring to FIG. 4, an example of tool path validation is illustrated. For a geometry chain 400, having a checkside offset chain 410 and a toolside offset chain for a left offset, 420, is illustrated, having a final merge into the tool path chain from the left as illustrated at 430. Ray 1, 440, and Ray 2, 450, illustrate two examples of projection of a validation ray from an arbitrary point in space to an arbitrary point on the guard zone chain's potential tool paths. If the result of tool path validation is to determine as valid a Tool Path, for any projected ray into that tool path, than the Tool Path will be found valid for any ray projected onto a point on that tool path (guard zone chain).

Referring to Table 6, the accumulated Tally for validity determination for Rays 1 and 2 of FIG. 4, and for Rays 3 and 4 for FIG. 5, are illustrated. Referring to Table 6, for Ray 1 of FIG. 4 there are no right to left or left to right crossings of the Ray 1 with the guard zone chains. Thus, the first two rows of columnar entries for the first column (i.e. Ray 1) are zero. Since the final merge is from the same direction as the offset direction, that is the final merge 430 of FIG. 4 is from the left into the tool path chain and the tool offset is left, the value added to the accumulated tally is the zero value, for merge-from-left/tool-from-left (TL/FL). All other merge values are ignored (zero value) since they are not applicable to this validation. The final accumulated tally for Ray 1 is zero, indicating that the tool path is valid. At this point, if the checkside offset chain were discarded, the remaining tool path would be the final output valid tool path chain to be followed in machining the pattern. In a more complex pattern, the output chain is one or more valid tool path chains, joined by common startpoints and endpoints, as shown in FIG. 1E and FIG. 6.

As discussed with reference to FIG. 4, when a portion of a tool path joins with another portion of the tool path, the side from which it is joined (i.e. left or right) is called the merge direction. When a portion of the Ray crosses a portion of the tool path, the side from which it crosses the Ray is called the crossing direction. This is illustrated in FIGS. 2, 4 and 6. In this regard, for merge direction and crossing direction, tool path refers to the checkside offset chain and toolside offset chain as potential toolpaths at this point in the process.

Referring again to FIG. 4 and Table 6, this time with reference to Ray 2, it is seen that there is one Right to Left crossing, which accounts for a minus 1 entry in the first row, second column of Table 6, for Ray 2. There are no Left to Right crossings of the guardzone chain with the Ray 2, so a zero value is assigned. The final merge is from the right, with a tool offset of left, resulting in the adding of a plus one (+1) to the accumulated tally for Ray 2, as illustrated in Table 6 at the fourth row, second column entry. All other merge parameters are ignored as inapplicable (e.g. assigned a zero value). The final accumulated tally is zero, indicating a valid tool path.

Referring to FIG. 5, a more complicated example of tool path validation is shown than that illustrated in FIG. 4. Table 6 illustrates the process for validation by accumulating a tally for Rays 3 and 4 of FIG. 5. FIG. 5 illustrates the tool path chains of FIG. 1E. For a geometry chain 500, and a Tool Path 530 having a left offset, two validation rays are drawn. Ray 3, 570, is drawn from an arbitrary point in space to point 590, which intersects with tool path chain 581. Ray 3 also intersects with tool path chain 583 at points 591 and 592 and with tool path chain 584 at intersection point 593.

Tool Path chain 581 has a final merge at 590 of Tool Left/Merge from Left. Tool Path chain 583 has one Right to Left crossing. Tool path chain 584 also has one Right to Left crossing with Ray 3 at point 593. Thus, as illustrated in Table 6, column 3, for Ray 3 of FIG. 5, for the two Right to Left crossings, there is a minus 2 (−2) entry in the first row, third column of Table 6, for Ray 3. There is also one Left to Right crossings of the guardzone chain with the Ray 3, so a plus one (+1) value is assigned as the entry for Ray 3. The final merge is from the left, with a tool offset of left, resulting in the adding of a zero (0) to the accumulated tally for Ray 3, as illustrated in Table 6 at the fourth row, third column entry. All other merge parameters are ignored as inapplicable (e.g. assigned a zero value). The final accumulated tally for Ray 3 is a minus one, indicating that tool path chain 581 is an invalid tool path.

However, for Ray 4, the validation process shows that the tested tool path is valid. Ray 4 has two Right to Left crossings at points 596 and 598 with the guard zone chain tool paths. Thus, there is a minus 2 (−2) entry in the first row, fourth column of Table 6, for Ray 4. There is also one Left to Right crossings of the guardzone chain with the Ray 4 at intersection point 597, so a plus one (+1) value is assigned as the entry for Ray 4, at the second row, fourth column of Table 6. The final merge direction of Ray 4 at intersection point 595 is a final merge from the right with a tool offset of left, resulting in the adding of a plus one (+1) to the accumulated tally for Ray 4, as illustrated in Table 6 at the fourth row, third column entry. All other merge parameters are ignored as inapplicable (e.g. assigned a zero value). The final accumulated tally for Ray 4 is a zero, indicating validation of tool path.

After all tool path chains in FIG. 5 are validated in accordance with the process in accordance as illustrated in FIGS. 4 and 5 and Table 6, pruning is performed to discard all invalid tool path chains. Next, any remaining checkzone chains are discarded. The remaining tool path chains represent the validated tool path chains. The resultant validated tool paths, Tool Paths I and III are illustrated in FIG. 6, corresponding to the validated tool paths remaining after validation of the tool paths of guardzone chain of FIG. 2, according to the process of analysis and validation as set forth elsewhere herein.

The selected value for the validation variables for crossings can be other than +1 and -1, so long as one value equals the other value negated.

Pruning

After completing validation, pruning is performed, all check zone chains are discarded and all invalid chains are discarded.

Table 6 illustrates the process of determining validation for Rays 1, 2, 3 and 4 of FIGS. 4 and 5.

Table 7 illustrates the nodes which are pruned for FIG. 2. Note that some nodes (18, 19, 23, 24) are discarded for both for being invalid chains and for being checkzone chains.

Manufacture

The remaining valid sequenced tool path chains are then converted into data that is recognized by the NC machine. This data is transmitted to the NC machine to cause it to follow the validated tool paths. After validation, only Tool Paths I and III of Table 4 remain valid Tool Paths. The final validated Tool Paths I and III as shown in FIG. 6, provide for completely satisfying movement of the Tool to machine the desired pattern.

Figure 7:
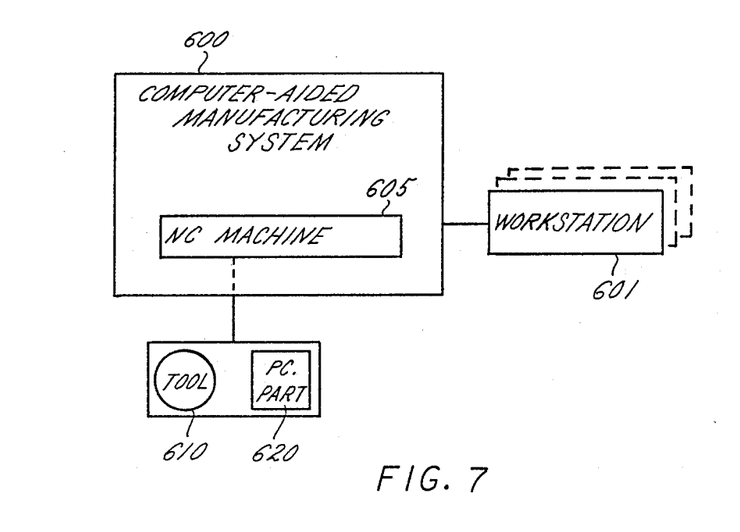
FIG. 7 is an illustration of a computer-aided manufacturing system embodiment of the present invention.

Referring to FIG. 7, a system embodiment of the present invention is illustrated. A person uses the workstation 601 to define a pattern to be machined (e.g. milled, etched, cut, scribed, etc.) out of a piece part (e.g. metal, plastic, fabric, paper, film, etc.) 620. The user workstation 601 can be comprised of a CPU, memory, and Input/Output 603 (which can extend from a Video Display Terminal to a complete computing system with hard disks, tape, printers, plotters, gateway links to other systems, etc.).

The pattern can be free-hand drawn or otherwise specified by the user (person), or can be generated by other means such as by a computer system or data-link.

The workstation 601, either alone or in conjunction with another computing system, analyzes the pattern, determines a guard zone chain, identifies points of intersection of the guard zone chain with itself, validates tool chains for output as valid Tool Paths along which to guide the movement of the Tool 610 along the piecepart 620 by the NC machine 605.

Referring to FIGS. 6 and 7, the Tool Paths 3-4-5-13 (Tool Path I) and 8-9-10 (Tool Path III) of FIG. 6 correspond to the movement in FIG. 7 of the Tool 610 to cause it to machine the geometric chain (pattern) of FIG. 6 into the piece-part 620 of FIG. 7. In an Alternate embodiment, as shown in Table 8, a Combined Tool Path Segment/Intersection List is created instead of the lists of Table 1 and 2.

Then, in place of the steps described hereinabove for Table 1, as associated with Tables 3 and 4, traverse the list of Table 8, proceeding to the next Intersection Marker, then, resuming at the departure node, repeating, until the loop is closed. Repeat these steps until the entire list of Table 8 has been exhausted. The remaining steps of validating, pruning, outputting control signals and manufacturing then proceed as described hereinabove.

The process of the present invention handles unlimited pockets, open contours, coincidences, etc., without special cases, and without restrictions on contours.

While there have been described herein various aspects and details of the illustrated embodiments associated with the present invention, it will be understood and appreciated by those skilled in the art, that the teachings of the present invention extends to various other aspects and embodiments. Therefore, the scope of the claims appended hereto shall be read in their broadest meaning consistent with the disclosure and drawings hereof.

TABLE 1

| INTERSECTION MARKER | Intersection List | | |
|---|---|---|---|
| | INITIAL | TERMINAL | DEPARTURE |
| A | 1 | 24 | 18 |
| B | 6 | 5 | 13 |
| C | 8 | 7 | 11 |
| D | 11 | 10 | 8 |
| E | 13 | 12 | 6 |
| F | 18 | 17 | 1 |
| G | 20 | 19 | 23 |
| H | 23 | 22 | 20 |

TABLE 2

| Tool Path Segment List | | | |
|---|---|---|---|
| Dummy | Intersection | Marker A | |
| 1 | Line Segment | Start 1 | End 2 |
| 2 | Clockwise Arc Segment | Start 2 | End 3 |
| 3 | Line Segment | Start 3 | End 4 |
| 4 | Clockwise Arc Segment | Start 4 | End 5 |
| 5 | Line Segment | Start 5 | End 6 |
| Dummy | Intersection | Marker B | |
| 6 | Clockwise Arc Segment Start 5 | | End 6 |
| Dummy | Intersection | Marker C | |
| | ( . . . and continues for all segments) | | |

TABLE 3

| INTERSECTION MARKER | INITIAL | TERMINAL | DEPARTURE |
|---|---|---|---|
| A | 1 | | |
| B | | 5 | 13 |
| C | | | |
| D | | | |
| E | 13 | | |
| F | | 17 | 1 |

TABLE 4

| Tool Path Chain | Nodes in Chain |
|---|---|
| I: | 1,2,3,4,5;13,14,15,16,17 |
| II: | 6,7;11,12 |
| III: | 8,9,10 |
| IV: | 18,19;23,24 |
| V: | 20,21,22 |

TABLE 5

| Ray Crossing Direction: | Guideline |
|---|---|
| Right to Left | Subtract One (Add −1) |
| Left to Right | Add One |
| Merge Direction from Left: | Guideline: |
| Tool Left | Add Zero |
| Tool Right | Subtract One |

TABLE 5-continued

| | (Add −1) |
|---|---|
| Merge Direction from Right: | Guideline: |
| Tool Left | Add One |
| Tool Right | Add Zero |

TABLE 6

| | Accumulated Tally | | | |
|---|---|---|---|---|
| | Ray 1 | Ray 2 | Ray 3 | Ray 4 |
| R-L Crossings | 0 | −1 | −2 | −2 |
| L-R Crossings | 0 | 0 | +1 | +1 |
| TL/FL Merge | 0 | 0 | 0 | 0 |
| TL/FR Merge | 0 | +1 | 0 | +1 |
| TR/FL Merge | 0 | 0 | 0 | 0 |
| TR/FR Merge | 0 | 0 | 0 | 0 |
| FINAL TALLY | 0 Valid | 0 Valid | −1 Valid | 0 Valid |
| | | (See FIG. 4) | | (See FIG. 5) |

TABLE 7

| Nodes Flagged as Check Zones |  |
|---|---|
| 14, 15, 16, 17, 18, 19, 20, 21, 22, 23, 24 | |
| Nodes in Non-Valid Tool-Path Chains | |
| 6, 7, 11, 12 | (Tool path chain II) |
| 18, 19, 23, 24 | (Tool path chain IV) |

TABLE 8

| Step 2 | Intersection Marker A, | Departure Node #18 |
|---|---|---|
| Step 1 | 1. line segment #1 | |
| | 2. line segment #2 | |
| | 3. line segment #3 | |
| | 4. line segment #4 | |
| | 5. line segment #5 | |
| | Intersection Marker B, | Departure Node #13 |
| | 6. line segment #6 | |
| | 7. line segment #7 | |
| | Intersection Marker C, | |
| | 8. line segment #8 | |
| | 9. line segment #9 | |
| | 10. line segment #10 | |

What is claimed:

1. A computer-aided-manufacturing system comprising:
    means for defining a pattern to be machined by a tool having an offset,
    means for defining a guard zone equidistantly spaced around said pattern by said offset.
    means for analyzing said pattern for points of intersections with said guard zone,
    means for breaking down said pattern into contiguous segments between said points of intersection,
    means for structuring a list of said segments, ordered between intersection points,
    means for defining tool path chains, responsive to contiguous connected segments of said list;
    means for validating said tool path chains to define valid tool paths, and,
    means for guiding the movement of said tool along said valid tool paths.

2. The system as in claim 1 wherein said means for structuring is further comprised of:
    means for identifying a departure node for each point of intersection, and,
    means for defining tool path chains responsive to selecting departure nodes at each intersection point.

3. The system as in claim 1 wherein said means for structuring is further characterized in that each segment is assigned a startpoint and an endpoint on the pattern; and,
    wherein said means for structuring a list utilizes said startpoints and endpoints of said segments, and intersection points where tool path chains cross one another.

4. The system as in claim 1, wherein said means for structuring is further characterized in that for each intersection point an Initial Node, Terminal Node and Departure Node are identified,
    wherein said means for structuring a list utilizes Departure Nodes, Initial Nodes and Terminal Nodes for each intersection point.

5. The system as in claim 1 wherein said means for validating is further comprised of:
    means for projecting a Ray from any point of the tool path chain into space in the plane of the path;
    means for identifying all Ray intersection points with points on said guard zone chain,
    means for providing the direction of tool offset;
    means for determining the direction of the tool path crossing at each Ray intersection point;
    means for determining the final merge direction of said Ray with the tool path;
    means for accumulating a Tally, including means for adding a first value for each left-to-right tool path intersection crossing direction, and a second value for each right-to-left intersection crossing direction, and a third value for a Ray final merge with said tool path chain from the same side as the Tool Offset, a fourth value for left Tool Offset for a Ray final merge with said tool path chain from the opposite side as the Tool Offset, and a fifth value for right Tool Offset for a Ray final merge with said tool path chain from the opposite side as the Tool Offset;
    means for determining the validity of said tool path responsive to the accumulated Tally.

6. The system as in claim 5 wherein said first value equals said fourth value, and said second value equals said first value.

7. The system as in claim 6 wherein said first value equals said second value negated.

8. The system as in claim 7 wherein said third value equals zero, and wherein said tool path is valid for an accumulated Tally equal to zero but invalid otherwise.

9. The system as in claim 1 wherein said means for validating is further comprised of:
    means for defining tool path chains as those segments between points of intersection responsive to the list, and
    means for validating each identified tool path chain as either a valid or invalid tool path.

10. The system as in claim 1 further comprising;
    input/output means for user communication with the system;
    wherein said pattern is defined responsive to said input/output means.

11. The system as in claim 1 further comprising:
    means for identifying a tool identity wherein said guard zone offset is determined responsive to said tool identity

12. A computer-aided-manufacturing process comprising the steps of:
- defining a pattern to be machined by a tool having an offset,
- defining a guard zone surrounding said pattern and spaced equidistantly from said pattern by said offset,
- analyzing said pattern for points of intersection, breaking down said pattern into contiguous segments between points of intersection,
- structuring a list of said tool path segments, ordered between intersection points,
- defining tool path chains, responsive to contiguous connected segments of said list;
- validating said tool path chains to define valid tool paths, and,
- guiding the movement of said tool along said valid tool path.

13. The process as in claim 12 wherein said step of structuring is further comprised of the steps of:
- identifying a departure node for each point of intersection,
- defining tool path chains responsive to selecting departure nodes at each intersection point.

14. The process as in claim 12 wherein:
- each segment is assigned a startpoint and an endpoint on the pattern; and,
- wherein said step of structuring a list utilizes said startpoints and endpoints of said segments, and intersection points where tool path chains cross one another.

15. The process as in claim 12, wherein:
- for each intersection point an Initial Node, Terminal Node and Departure Node are identified,
- wherein said step of structuring a list utilizes Departure Nodes, Initial Nodes and Terminal Nodes for each intersection point.

16. The process as in claim 12 wherein said step of validating is further comprised of the steps of:
- projecting a Ray from any point of the tool path chain into space in the plane of the path;
- identifying all Ray intersection points with points on said guard zone chain;
- providing the direction of tool offset;
- determining the direction of the tool path crossing at each Ray intersection point;
- determining the final merge direction of said Ray with the tool path;
- accumulating a Tally, including means for adding a first value for each left-to-right intersection crossing direction, and a second value for each right-to-left intersection crossing direction, and a third value for a Ray final merge with said tool path chain from the same side as the Tool Offset, a fourth value for left Tool Offset for a Ray final merge with said tool path chain from the opposite side as to Tool Offset, and a fifth value for right Tool Offset for a Ray final merge with said tool path chain from the opposite side as the Tool Offset;
- determining the validity of said tool path responsive to the accumulated Tally.

17. The process as in claim 16 wherein said first value equals said fourth value, and said second value equals said first value.

18. The process as in claim 17 wherein said first value equals said second value negated.

19. The process as in claim 18 wherein said third value equals zero, and wherein said tool path is valid for an accumulated Tally equal to zero but invalid otherwise.

20. The process as in claim 12 wherein said step of validating is further comprised of the steps of:
- defining tool path chains as those segments between points of intersection responsive to the list, and
- validating each identified tool path chain as either a valid or invalid tool path.

21. A computer-aided manufacturing system comprising:
- means for providing for input and output communications with a user;
- means for providing a pattern;
- means for defining a guard zone chain which defines a zone equidistantly spaced around said pattern by a predefined offset;
- means for identifying points of intersection of said pattern with said guard zone chain, and means for defining tool path chains between said points of intersection;
- means for validating said tool path chains; and,
- means for providing an output representative of validated tool paths which define said pattern;
- wherein said means for validating is further comprised of
- means for projecting a Ray from any point on the tool path chain into space in the plane of the path;
- means for identifying all Ray intersection points with points on said guard zone chain,
- means for providing the direction of tool offset;
- means for determining the direction of the crossing at each Ray intersection point;
- means for determining the final merge direction of said Ray with the tool path;
- means for accumulating a Tally, including means for adding a first value for each left-to-right intersection crossing direction, and a second value for each right-to-left intersection crossing direction, and a third value for a Ray final merge with said tool path chain from the same side as the Tool Offset, a fourth value for left Tool Offset for a Ray final merge with said tool path chain from the opposite side as the Tool Offset, and a fifth value for right Tool Offset for a Ray final merge with said tool path chain from the opposite side as the Tool Offset;
- means for determining the validity of said tool path responsive to the accumulated Tally.

22. The system as in claim 21 wherein said first value equals said fourth value, and said second value equals said fifth value.

23. The system as in claim 22 wherein said first value equals said second value negated.

24. The system as in claim 23 wherein said third value equals zero, and wherein said tool path is valid for an accumulated Tally equal to zero but is invalid otherwise.

25. A computer-aided manufacturing process comprising the steps of:
- providing for input and output communications with a user;
- providing a pattern;
- defining a guard zone chain which defines a zone around the pattern;

identifying all points of intersection of said pattern with said guard zone chain, and defining tool path chains between said points of intersection;

validating said tool path chains;

providing an output representative of valid tool paths which define said pattern;

wherein said step of validating is further comprised of the steps of projecting a Ray from any point on the tool path chain into space in the plane of the path;

identifying all Ray intersection points with other points on the tool path chain, providing the direction of tool offset;

determining the direction of the tool path crossing at each Ray intersection point;

determining the final merge direction of the Ray with the tool path;

accumulating a Tally, including means for adding a first value for each left-to-right tool path crossing direction, and a second value for each right-to-left tool path crossing direction, and a third value for a Ray final merge from the same side as the Tool Offset, a fourth value for left Tool Offset for a Ray final merge from the opposite side as the Tool Offset, and a fifth value for right Tool Offset for a Ray final merge from the opposite side as the Tool Offset;

determining the validity of said tool path responsive to the accumulated Tally.

26. A computer-aided manufacturing process comprising the steps of:

providing for input and output communications with a user;

providing a pattern;

defining a guard zone chain which defines a zone around the pattern;

identifying all points of intersection of said pattern with said guard zone chain, and defining tool path chains between said points of intersection;

validating said tool path chains;

providing an output representative of valid tool paths which define said pattern;

wherein said step of validating is further comprised of the steps of projecting a Ray from any point on the tool path chain into space in the plane of the path;

identifying all Ray intersection points with points on the guard zone chain, providing the direction of tool offset;

determining the direction of the tool path crossing at each Ray intersection point;

determining the final merge direction of said Ray with said tool path;

accumulating a Tally, including means for adding a first value for each left-to-right intersection crossing direction, and a second value for each right-to-left intersection crossing direction, and a third value for a Ray final merge with said tool path chain from the same side as the Tool Offset, a fourth value for left Tool Offset for a Ray final merge with said tool path chain from the opposite side as the Tool Offset, and a fifth value for right Tool Offset for a Ray final merge with said tool path chain from the opposite side as the Tool Offset;

determining the validity of raid tool path responsive to the accumulated Tally.

* * * * *